United States Patent [19]

Goldstein et al.

[11] 4,238,676
[45] Dec. 9, 1980

[54] GAMMA FLUX RESPONSIVE SELF-POWERED DETECTOR WITH A TUBULAR EMITTER

[75] Inventors: Norman P. Goldstein, Murrysville, Pa.; William H. Todt, Elmira Heights, N.Y.

[73] Assignee: Westinghouse Electric Corp., Pittsburgh, Pa.

[21] Appl. No.: 911,578

[22] Filed: Jun. 1, 1978

[51] Int. Cl.² ........................................................ 1/22
[52] U.S. Cl. .................................................. 250/370
[58] Field of Search ............... 250/370, 371, 390, 391, 250/392

[56] References Cited

U.S. PATENT DOCUMENTS

| | | | |
|---|---|---|---|
| 3,259,745 | 7/1966 | Garlick et al. | 250/390 |
| 3,603,793 | 9/1971 | Warren | 250/392 |
| 3,787,697 | 10/1971 | Shields | 250/390 |
| 3,986,032 | 10/1976 | Klar et al. | 250/390 |
| 4,091,288 | 5/1978 | LeVert et al. | 250/370 |

Primary Examiner—Davis L. Willis
Assistant Examiner—Janice A. Howell
Attorney, Agent, or Firm—W. G. Sutcliff

[57] ABSTRACT

An improved response gamma sensitive self-powered detector is provided by forming the conductive central emitter as a tubular member. Low density, non-attenuating insulating means is disposed within the tubular emitter and about the tubular emitter spacing it from the coaxial outer conductive collector.

5 Claims, 3 Drawing Figures

GAMMA FLUX RESPONSIVE SELF-POWERED DETECTOR WITH A TUBULAR EMITTER

BACKGROUND OF THE INVENTION

The present invention relates to self-powered radiation detectors, and more specifically to gamma flux responsive detectors. A self-powered radiation detector does not require a drive potential to generate a signal current. The signal current is the resultant difference between electron currents produced between the inner emitter electrode and the coaxial outer collector electrode as a result of the neutron or gamma flux interactions with the collector and emitter electrodes.

Gamma flux responsive self-powered detectors employ a low neutron cross-section, high atomic weight, high density emitter material such as platinum, lead, bismuth, tantalum, or tungsten. The collector material is also a low neutron cross-section material such as high nickel content steel. The gamma flux from a reactor produces an inward current from interaction with the collector electrode, and an outward current from the interaction of gamma photons with the emitter. The net difference between these currents is sensed as the signal current which is indicative of reactor condition.

The typical gamma responsive self-powered detectors of the prior art typically were fabricated with a solid platinum emitter, about 0.020 inch diameter being the typical emitter dimension.

It has been discovered that some improvement in response of a platinum emitter detector can be achieved by increasing the diameter of the emitter. The sensitivity of such platinum detectors can be doubled by increasing the emitter diameter to about 0.080 inch. Further analysis of such enlarged diameter emitters and of the electron signal producing mechanism have led the present inventors to a further improvement in detector sensitivity, as will be explained by reference to FIG. 3 which illustrates a conventional self-powered detector structure.

The electron current from the central emitter results from gamma rays travelling through the emitter and interacting at its far side to produce an outgoing electron. Gamma interaction on the incoming or incident side of the emitter produces electrons which travel further into the emitter and are unable to escape from the emitter. As the emitter diameter is increased, incident gamma rays have to travel a greater distance through the emitter material in order to reach the far side of the emitter. Since the emitter material has a high atomic weight and high density, the incident gamma rays will be attenuated in passing through the emitter material and there will be less outward electron current.

SUMMARY OF THE INVENTION

An improved response gamma flux sensitive self-powered radiation detector is provided by forming the emitter electrode as a tubular member. The tubular emitter electrode has insulating means within the emitter tube, and also about the emitter tube between it and the coaxial outer conductive collector electrode.

DESCRIPTION OF THE PREFERRED EMBODIMENT

Figure 1:
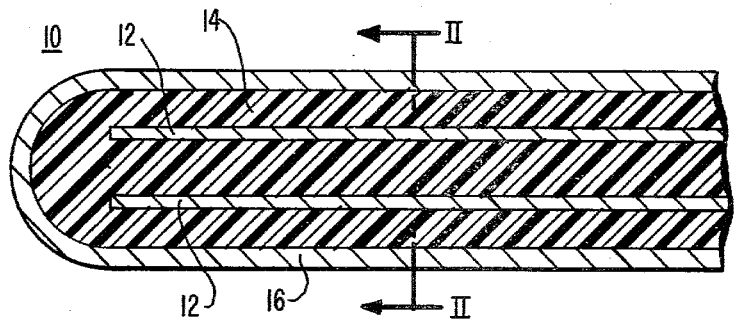
FIG. 1 is a side elevation view in section of the self-powered detector of the present invention.
Figure 2:
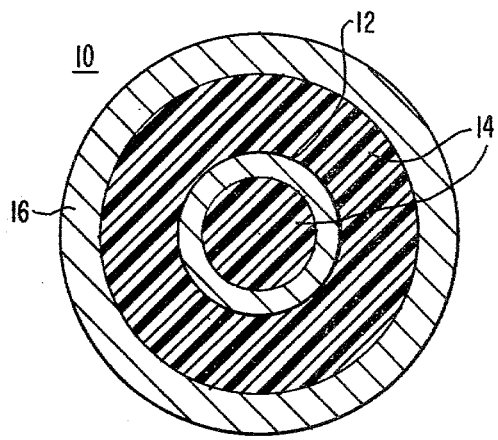
FIG. 2 is a sectional view along lines II—II of the FIG. 1 embodiment.
Figure 3:
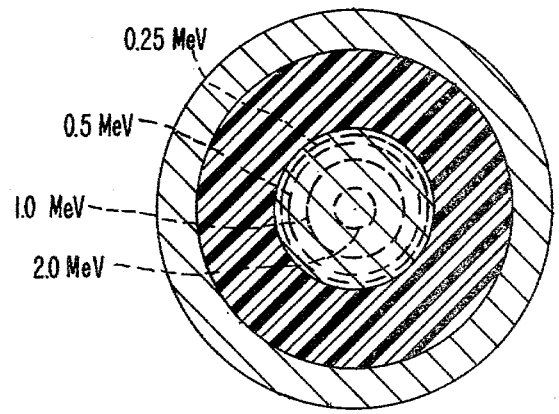
FIG. 3 is a cross-sectional representation of the prior art self-powered detector structure illustrating the electron escape energy range for such detector.

The invention can be best understood by reference to the embodiment seen in FIGS. 1 and 2, while reference to FIG. 3 illustrates the advantage of the structure of the present invention.

A gamma flux responsive self-powered radiation detector 10, is seen in FIGS. 1 and 2. The detector 10 comprises a tubular conductive emitter electrode 12, with insulating means 14 both within and about the tubular emitter electrode 12 to insulate the tubular emitter electrode 12 from the coaxial outer conductive collector electrode 16.

The tubular conductive emitter electrode 12 is formed of a low neutron cross-section, high density metal such as platinum, lead, bismuth, tantalum or tungsten. The tubular emitter should be high temperature resistant but have reasonable workability to facilitate fabrication. The tubular emitter 12 preferably has an outside diameter of about 0.080 inch, and a tube wall thickness of from about 0.005 to 0.010 inch. The insulating means 14 is a material which is high temperature and radiation resistant with its resistivity remaining very high under all conditions, and is for example densely compacted aluminum oxide or magnesium oxide. The insulating means 14 fills the tubular emitter and also is disposed between the tubular emitter and the collector with about a 0.020 inch thickness. The coaxial conductive collector 16 is typically formed of a high temperature resistant low neutron cross-section material such as Inconel steel, or other such high nickel content steel. Inconel is a trademarked material of the International Nickel Company. The collector has a typical wall thickness of about 0.010 inch, and the detector outside diameter is thus about 0.140 inch.

In the prior art detector representation seen in FIG. 3, the solid emitter electrode has several concentric circles drawn at various diameters within the emitter area. The outermost circle closest to the outer surface of the emitter illustrates the distance which a 0.25 Mev electron will traverse to escape the emitter after such an electron is produced by a gamma ray interaction with the emitter material. Electrons of this energy which are produced further inward within the emitter will not escape from the emitter. The succeeding inner circles illustrate the range for 0.5, 1.0, and 2.0 MeV electrons, and further illustrate that only the most energetic electrons can escape from the central region of the emitter. It should be appreciated that a major portion of the electrons which are produced from the gamma flux in a commercial nuclear reactor core will have an energy less than about 1 MeV.

This means that the center portion of the emitter produces little signal current contribution and can be effectively removed without significantly decreasing the portion of the emitter which does contribute to signal current. This is particularly the case where the overall emitter diameter is increased to increase device sensitivity. At the same time, removal of the emitter center region, as is achieved by a tubular emitter structure, decreases the attenuation of gammas passing through the emitter. Such reduced attenuation results in greater gamma interaction on the far side of the emitter as the gamma passes through the emitter, producing a higher overall signal current.

What we claim is:

1. A gamma flux sensitive self-powered radiation detector comprising a generally tubular emitter formed of a conductive metal having a high atomic weight, low neutron cross-section, and is high temperature resistant, an insulating core within the tubular emitter, an insulating layer about the tubular emitter, and a generally tubular conductive collector electrode about the insulating layer.

2. The gamma flux sensitive self-powered detector set forth in claim 1, wherein the tubular emitter material is selected from the group consisting of platinum, lead, bismuth, tantalum and tungsten.

3. The gamma flux sensitive self-powered detector set forth in claim 1, wherein the tubular emitter material is platinum and the outside diameter of the tubular platinum emitter is about 0.080 inch, and the tubular emitter wall thickness is about 0.005 to 0.010 inch.

4. An improved gamma flux sensitive self-powered radiation detector comprising a central conductive emitter, insulation means about the emitter, and a conductive generally tubular outer collector sheath about the insulating means, the improvement wherein the emitter is a relatively thin walled tubular member with insulating means within the tubular emitter member.

5. An improved gamma flux sensitive self-powered radiation detector comprising a coaxial conductor device, with an inner conductive emitter and spaced coaxially about and insulated from the emitter is a conductive collector, the improvement wherein the emitter is a relatively thin walled tubular member with insulating means within the tubular emitter member.

* * * * *